US011870887B2

(12) United States Patent
Olsson et al.

(10) Patent No.: US 11,870,887 B2
(45) Date of Patent: Jan. 9, 2024

(54) MANAGING CENTRAL SECRET KEYS OF A PLURALITY OF USER DEVICES ASSOCIATED WITH A SINGLE PUBLIC KEY

(71) Applicant: ASSA ABLOY AB, Stockholm (SE)

(72) Inventors: Håkan Olsson, Hägersten (SE); Frans Lundberg, Saltsjöbaden (SE)

(73) Assignee: ASSA ABLOY AB, Stockholm (SE)

( * ) Notice: Subject to any disclaimer, the term of this patent is extended or adjusted under 35 U.S.C. 154(b) by 129 days.

(21) Appl. No.: 17/057,802

(22) PCT Filed: Jun. 27, 2019

(86) PCT No.: PCT/EP2019/067151

§ 371 (c)(1),
(2) Date: Nov. 23, 2020

(87) PCT Pub. No.: WO2020/015974

PCT Pub. Date: Jan. 23, 2020

(65) Prior Publication Data

US 2021/0203490 A1 Jul. 1, 2021

(30) Foreign Application Priority Data

Jul. 17, 2018 (EP) .................................... 18183913

(51) Int. Cl.
*H04L 9/08* (2006.01)

(52) U.S. Cl.
CPC ............ *H04L 9/0825* (2013.01); *H04L 9/083* (2013.01); *H04L 9/0894* (2013.01)

(58) Field of Classification Search
None
See application file for complete search history.

(56) References Cited

U.S. PATENT DOCUMENTS 7,000,115 B2 2/2006 Lewis
7,664,260 B2 2/2010 Futa et al.
(Continued)

FOREIGN PATENT DOCUMENTS

CN 101430751 5/2009
CN 105577383 5/2016
(Continued)

OTHER PUBLICATIONS

Krohn "[messaging] Multiple devices and key synchronization: some thoughts," Messaging Mailing List, Dec. 29, 2014 [retrieved online from: moderncrypto.org/mail-archive/messaging/2014/001303.html].

(Continued)

*Primary Examiner* — Bassam A Noaman
(74) *Attorney, Agent, or Firm* — Schwegman Lundberg & Woessner, P.A.

(57) ABSTRACT

It is provided a method for managing central secret keys of a plurality of user devices associated with a single public key. The method is performed in a key manager and comprises the steps of: receiving, from a first user device, transformation data and an identifier of a second user device; obtaining a first central secret key associated with the first user device; generating a second central secret key by applying the transformation data to the first central secret key, wherein the transformation data is applied in reverse to how the same transformation data is applied by the first user device to a device secret key of the first user device; and storing the second central secret key in association with the second user device.

15 Claims, 3 Drawing Sheets

Start
40 Receive transformation data
42 Obtain first central secret key
44 Generate second central secret key
46 Store second central secret key
48 Receive request
50 Select central secret key
52 Cooperate
End

(56) References Cited

U.S. PATENT DOCUMENTS

| | | | | |
|---|---|---|---|---|
| 8,437,474 | B2 * | 5/2013 | Zheng | H04L 9/0833 713/180 |
| 2013/0205379 | A1 * | 8/2013 | Kang | G06F 21/445 726/7 |
| 2015/0079933 | A1 * | 3/2015 | Smith | H04W 4/02 455/411 |
| 2016/0127128 | A1 | 5/2016 | Chen et al. | |
| 2018/0091361 | A1 * | 3/2018 | Smith | H04L 67/51 |
| 2019/0034919 | A1 * | 1/2019 | Nolan | G06Q 20/389 |
| 2019/0349426 | A1 * | 11/2019 | Smith | H04L 69/18 |
| 2019/0379537 | A1 * | 12/2019 | Kärkkäinen | G06F 21/6281 |

FOREIGN PATENT DOCUMENTS

| | | | |
|---|---|---|---|
| EP | 3598689 | | 1/2020 |
| EP | 3598689 | | 1/2022 |
| WO | WO 2007121587 | A1 * | 11/2007 |
| WO | 2018125989 | | 7/2018 |
| WO | 2020015974 | | 1/2020 |

OTHER PUBLICATIONS

Nicolosi et al. “Proactive Two-Party Signatures for User Authentication,” Proceedings of the 10th Annual Network and Distributed System Security Symposium, Feb. 1, 2003, pp. 233-248.

Extended Search Report for European Patent Application No. 18183913.5, dated Jan. 30, 2019, 6 pages.

International Search Report and Written Opinion for International (PCT) Patent Application No. PCT/EP2019/067151, dated Sep. 19, 2019, 12 pages.

Second Written Opinion for International (PCT) Patent Application No. PCT/EP2019/067151, dated Jun. 18, 2020, 6 pages.

International Preliminary Report on Patentability for International (PCT) Patent Application No. PCT/EP2019/067151, dated Oct. 23, 2020, 14 pages.

Intention to Grant for European Patent Application No. 18183913.5, dated May 7, 2021, 30 pages.

Official Action with English Translation for Korea Patent Application No. 10-2020-7036113, dated May 26, 2022, 5 pages.

“International Application Serial No. PCT EP2019 067151, Response to Written Opinion filed Oct. 6, 2020 to Written Opinion dated Sep. 19, 2019”, 6 pgs.

“European Application Serial No. 18183913.5, Intention to Grant dated Sep. 27, 2021”, 23 pgs.

“European Application Serial No. 18183913.5, Communication Pursuant to Article 94(3) EPC dated Nov. 16, 2020”, 2 pgs.

“European Application Serial No. 18183913.5, Response filed Jan. 14, 2021 to Communication Pursuant to Article 94(3) EPC dated Nov. 16, 2020”, 6 pgs.

“European Application Serial No. 18183913.5, Response filed Sep. 7, 2021 to Intention to Grant dated May 7, 2021”, 5 pgs.

“180535CN 1st OA with Search Report dated Jul. 29, 2023”, with English translation, (dated Jul. 29, 2023), 22 pages.

* cited by examiner

MANAGING CENTRAL SECRET KEYS OF A PLURALITY OF USER DEVICES ASSOCIATED WITH A SINGLE PUBLIC KEY

CROSS REFERENCE TO RELATED APPLICATIONS

This application is a national stage application under 35 U.S.C. 371 and claims the benefit of PCT Application No. PCT/EP2019/067151 having an international filing date of Jun. 27, 2019, which designated the United States, which PCT application claimed the benefit of European Patent Application No. 18183913.5 filed Jul. 17, 2018, the disclosure of each of which are incorporated herein by reference.

TECHNICAL FIELD

The invention relates to a method, a key manager, a computer program and a computer program product for managing central secret keys of a plurality of user devices associated with a single public key.

BACKGROUND

Cryptographic key pairs are used more and more, e.g. for encryption and signing of digital data. A cryptographic key pair consists of a public key and a secret key (also known as a private key). For signing digital content, the user signs the data using the secret key, after which anyone can verify the signature using the public key. For encryption, data can be encrypted by anyone for a user using the public key, after which decryption can only occur using the secret key.

It is thus of utmost importance that the secret key is kept secret. One solution is that the secret key never leaves the user device of the user. However, a user may have multiple devices e.g. phones, computers, tablet computers, etc. Additionally, a company with multiple employees might want to provide all employees to represent the company, requiring the secret key of the company to be distributed. Ideally, one public key should be applicable for all of these different devices.

The secret key could be copied across devices, but this creates a security risk. One of the devices could be lost or stolen, whereby the integrity of all copies of secret keys is compromised.

SUMMARY

It is an object to improve how secret keys of cryptographic key pairs are managed.

According to a first aspect, it is provided a method for managing central secret keys of a plurality of user devices associated with a single public key.

The method is performed in a key manager and comprises the steps of: receiving, from a first user device, transformation data and an identifier of a second user device; obtaining a first central secret key associated with the first user device; generating a second central secret key by applying the transformation data to the first central secret key, wherein the transformation data is applied in reverse to how the same transformation data is applied by the first user device to a device secret key of the first user device; and storing the second central secret key in association with the second user device.

The step of generating the second central secret key may comprise applying the transformation data as a numerical offset to the existing central secret key.

The method may further comprise the steps of: receiving a request to perform a cryptographic action for one of the user devices, the request being associated with a particular one of the user devices; selecting a central secret key corresponding to the user device of the request, yielding a selected secret key; and cooperating with the user device of the request, such that the selected central secret key is applied by the key manager and the device secret key of the user device of the request is applied by the user device of the request, to thereby perform the cryptographic action.

The step of cooperating with the user device of the request may comprise the substeps of: applying the selected central secret key for a set of data, yielding resulting data; and transmitting the resulting data.

The cryptographic action may be decrypting a set of data.

The cryptographic action may be signing a set of data.

The transformation data may comprise a numerical value. In one embodiment, the transformation data is a numerical value.

According to a second aspect, it is provided a key manager for managing central secret keys of a plurality of user devices associated with a single public key. The key manager comprises: a processor; and a memory storing instructions that, when executed by the processor, cause the key manager to: receive, from a first user device, transformation data and an identifier of a second user device; obtain a first central secret key associated with the first user device; generate a second central secret key by applying the transformation data to the first central secret key, wherein the transformation data is applied in reverse to how the same transformation data is applied by the first user device to a device secret key of the first user device; and store the second central secret key in association with the second user device.

The instructions to generate the second central secret key may comprise instructions that, when executed by the processor, cause the key manager to apply the transformation data as a numerical offset to the existing central secret key.

The key manager may further comprise instructions that, when executed by the processor, cause the key manager to: receive a request to perform a cryptographic action for one of the user devices, the request being associated with a particular one of the user devices; select a central secret key corresponding to the user device of the request, yielding a selected secret key; and cooperate with the user device of the request, such that the selected central secret key is applied by the key manager and the device secret key of the user device of the request is applied by the user device of the request, to thereby perform the cryptographic action.

The instructions to cooperate with the user device of the request may comprise instructions that, when executed by the processor, cause the key manager to: apply the selected central secret key for a set of data, yielding resulting data; and transmit the resulting data.

The cryptographic action may be decrypting a set of data.

The cryptographic action may be signing a set of data.

The transformation data may comprise a numerical value. In one embodiment, the transformation data is a numerical value.

According to a third aspect, it is provided a computer program for managing central secret keys of a plurality of user devices associated with a single public key. The computer program comprises computer program code which, when run on a key manager causes the to: receive, from a first user device, transformation data and an identifier of a second user device; obtain a first central secret key associated with the first user device; generate a second central secret key by applying the transformation data to the first central secret key, wherein the transformation data is applied in reverse to how the same transformation data is applied by the first user device to a device secret key of the first user device; and store the second central secret key in association with the second user device.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on secret keys being applied in cooperation between a key manager and user devices. Both entities need to apply their respective secret keys for a cryptographic action (such as signing or decrypting) to occur. A corresponding public key corresponds to the combined action of the two secret keys. Additional secret key sets can be generated which, when both are applied, still correspond to the public key.

Figure 1:
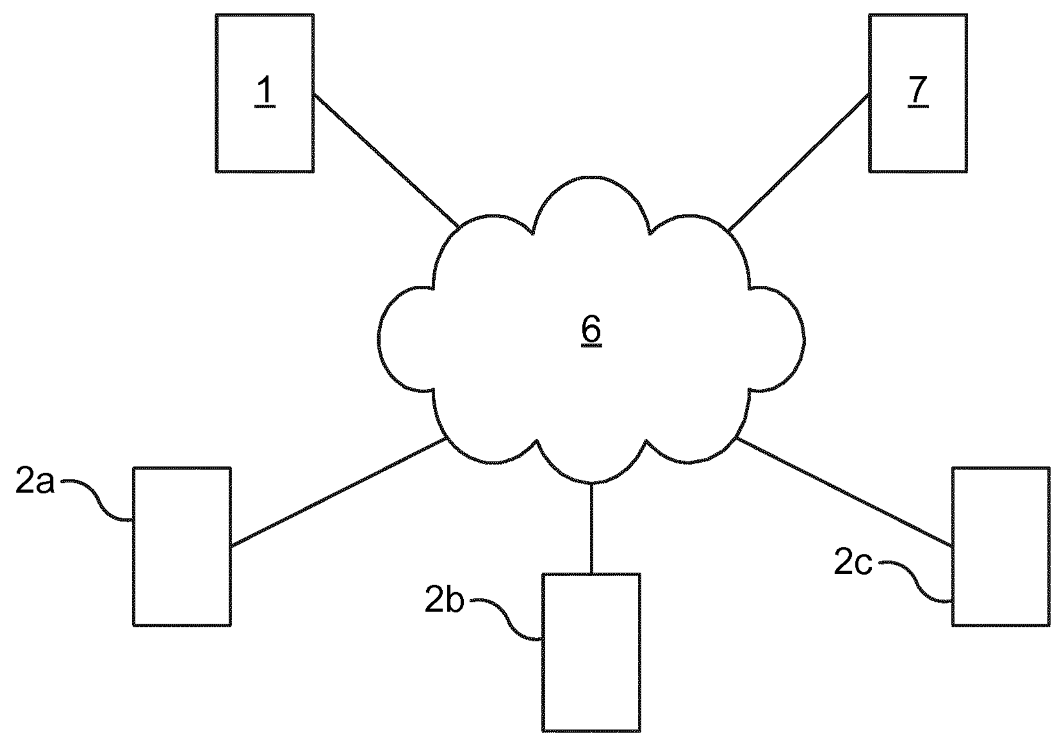
FIG. 1 is a schematic diagram illustrating an environment in which embodiments presented herein can be applied.

FIG. 1 is a schematic diagram illustrating an environment in which embodiments presented herein can be applied.

There are a number of different user devices 2*a-c*. In this example there are three user devices 2*a-c*, but more or fewer user devices can be provided, as long as there are at least two user devices.

Each user device 2*a-c* is any implemented as any suitable device with capability of processing and communication. For instance, the user devices 2*a-c* can be implemented as a wearable device, a mobile phone, a smart phone or a tablet/laptop computer with wireless connectivity.

A key manager 1 is provided to cooperate with the user devices 2*a-c* in terms of cryptographic key pairs. The key manager 1 can be implemented forming part of a server.

A third party device 7 is provided which one of the user devices 2*a-c* may wish to interact with. In the interaction with the third party device 7, the user device needs to perform a cryptographic action which involves the use of a secret key of a cryptographic pair. The cryptographic action can e.g. be decrypting data or signing data.

A communication network 6 is provided to allow the different entities to communicate with each other. The communication network 6 can be based on any number of suitable wired and/or wireless protocols, e.g. Ethernet, Bluetooth or Bluetooth Low Energy (BLE), ZigBee, any of the IEEE 802.11x standards (also known as WiFi), any cellular network, etc.

Figure 2A:
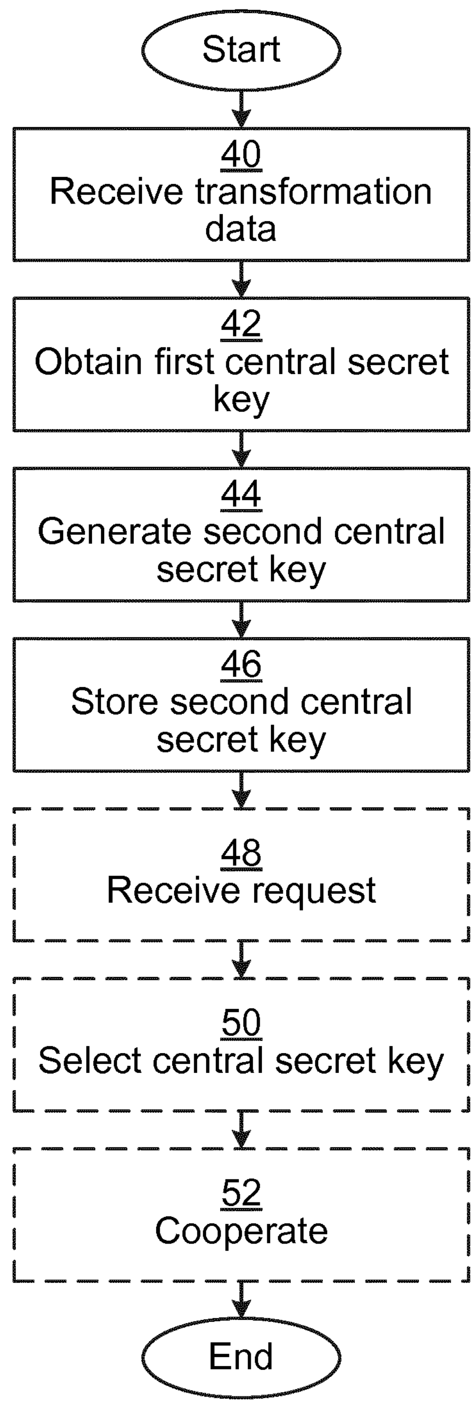
FIGS. 2A-B are flow charts illustrating embodiments of methods for managing central secret keys of a plurality of user devices associated with a single public key.
Figure 2B:
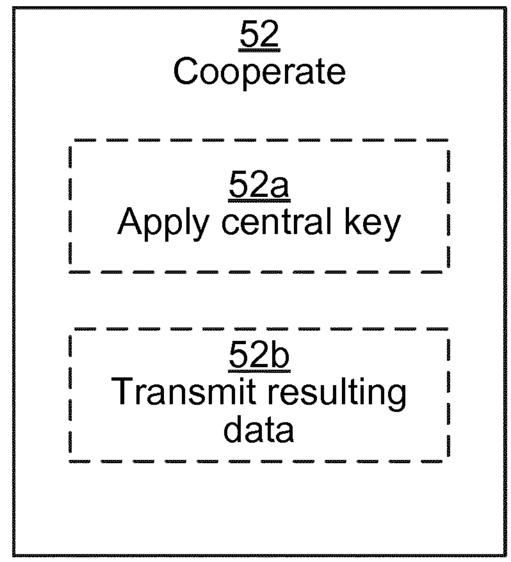

FIGS. 2A-B are flow charts illustrating embodiments of methods for managing central secret keys of a plurality of user devices (2*a-c*) associated with a single public key. The methods are performed in the key manager.

In a receive transformation data step 40, the key manager receives, from a first user device, transformation data and an identifier of a second user device. The reason for this action can be that the user of the first user device would like to generate a corresponding secret key set for the second user 25 device.

The transformation data includes (or is) a numerical value. For applying the transformation data, an operation and an implied or explicit reverse operation is used. In one example, the operation is an addition, with an implicit or explicit reverse operation being subtraction (or vice versa). The operation then functions as an offset. In another example, the operation is a multiplication, with an implicit or explicit reverse operation being division (or vice versa). The operation and reverse operation can be preconfigured and only the numerical value of the transformation data is received in this step. Alternatively, the operation and (implied or explicit) reverse operation is also received in this step.

In an obtain first central secret key step 42, the key manager obtains the first central secret key associated with the first user device. The first central secret key can be obtained from data memory (see 66 of FIG. 3).

In a generate second central secret key step 44, the key manager generates a second central secret key by applying the transformation data to the first central secret key. The transformation data is applied here in reverse, in comparison with how the same transformation data is applied by the first user device to a device secret key of the first user device. For instance, the transformation data can be applied as a numerical offset to the first central secret key. One of the first user device and the key manager adds the numerical offset to its first secret key while the other subtracts the numerical offset from its first secret key. Alternatively, the transformation data can be applied to the first central secret key using multiplication or division. In such a case, one of the first user device and the key manager multiplies the transformation data to its first secret key while the other divides its first secret key with the transformation data.

The first user device also creates a secure and authenticated channel to the second user device (e.g. using a public key specific for the second user device) and transfers the second device secret key to the second user device. The first user device then deletes the second device secret key and the transformation data.

In a store second central secret key step 46, the key manager stores the second central secret key in association with the second user device.

The second user device can now cooperate with the key manager to perform cryptographic actions using the second device secret key and the second central secret key. The cryptographic action is performed in correspondence with the same public key as for the combination of the first device secret key and the first central secret key. However, the second user device and the key manager might not be certain that the first user device actually deleted the second device secret key. One way to solve this is that step 44 is performed again, using secure communication between the key manager and the second user device, resulting in an evolved second device secret key and an evolved second central secret key. Since the secure communication can be set up with a key pair specific for the second user device, the first user device is unable to generate the same second evolved device secret key.

Once the second central secret key is stored, the following steps can be performed when a central secret key for one of the user devices is to be utilised. These steps can be performed at a completely different point in time than the preceding steps.

In a receive request step 48, the key manager receives a request to perform a cryptographic action for one of the user devices. The request is associated with a particular one of the user devices. In fact, the request can be received from that particular user device. The cryptographic action is e.g. decrypting a set of data or signing a set of data. For the key manager to trust the user device that sends the request, each user device optionally has a traditional cryptographic key pair as an identifier, which key pair is specific for that user device. Hence, in such an embodiment, only if the user device contacts the key manager through a secure channel and identifies itself, using its own key pair, then the server will perform the cryptographic action of the request.

In a select central secret key step 50, the key manager selects a central secret key corresponding to the user device of the request, yielding a selected secret key. For instance, if the first device requests a cryptographic action in the request, the key manager selects the first central secret key.

In a cooperate step 52, the key manager cooperates with the user device of the request, such that the selected central secret key is applied by the key manager and the device secret key of the user device of the request is applied by the user device of the request. This results in the cryptographic action being performed. The cryptographic action can e.g. be decrypting a set of data or signing a set of data.

It is to be noted that, for the second user device, when both (both central and device) second secret keys are applied, the result still corresponds to the original public key. In other words, any number new sets of keys can be generated which (when applied in corresponding pairs of central secret key and device secret key) all correspond to the same public key. In this way, a plurality of sets of secret keys can be obtained, where each set of secret keys is applied for a different user device, where one secret key is stored by the key manager and one secret key is stored by the user device.

Moreover, any combination of central secret key and device secret key can be blocked either by the key manager or the user device, without affecting any other sets of central secret key and device secret key for the same public key. This is of great use if e.g. a user device is lost or stolen and the secret key of the user device needs to be blocked. Additionally, since the central secret keys are not sufficient by themselves to perform a cryptographic action, a hacker cannot gain access to the complete secret key by hacking just the key manager.

Looking now to FIG. 2B, this shown optional substeps of the cooperate step 52 of FIG. 2A.

In an optional apply central key substep 52*a*, the key manager applies the selected central secret key for a set of data, yielding resulting data.

When the cryptographic action is decrypting, the resulting data comprises a set of data which has been decrypted using the central secret key for the user device in question. When the cryptographic action is signing, the resulting data comprises an electronic signature applied using the central secret key for the user device in question.

The user device also needs to perform a corresponding cryptographic action, which can occur prior to this step or after this step. In other words, for a signature to be applied, both the user device and the key manager needs to perform cryptographical signing. Analogously, for a decryption to occur, both the user device and the key manager needs to perform cryptographical decryption. In one embodiment, when applied for decryption, the key manager performs its decryption action prior to the use device. In this way, only the key device has access to decrypted data.

In an optional transmit resulting data substep 52*b*, the key manager transmits the resulting data, e.g. back to the user device which sent the request received in step 48.

Figure 3:
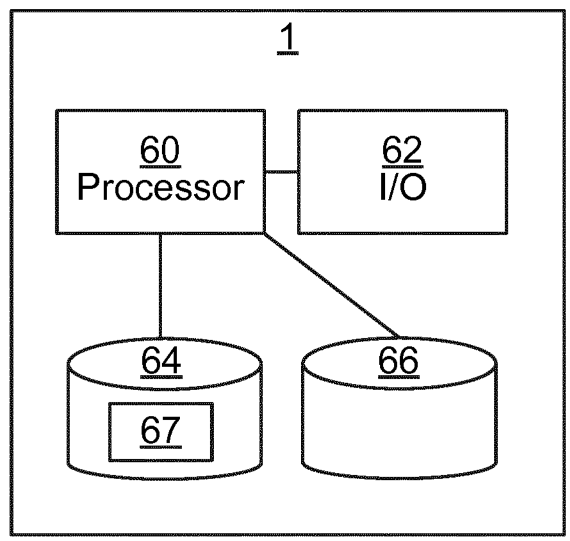
FIG. 3 is a schematic diagram illustrating components of the key manager of FIG. 1 according to one embodiment.

FIG. 3 is a schematic diagram illustrating components of the key manager 1 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 2A-B above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The key manager 1 further comprises an I/O interface 62 for communicating with external and/or internal entities. Optionally, the I/O interface 62 also includes a user interface.

Other components of the key manager 1 are omitted in order not to obscure the concepts presented herein.

Figure 4:
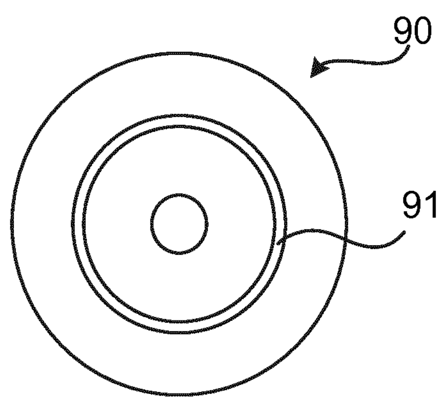
FIG. 4 shows one example of a computer program product comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for managing central secret keys of a plurality of user devices associated with a single public key, the method being performed in a key manager and comprising:

receiving, from a first user device, transformation data and an identifier of a second user device;

obtaining, from a data memory, a first central secret key associated with the first user device associated with the single public key;

generating a second central secret key by applying the transformation data to the first central secret key, wherein the transformation data is applied in reverse to how the transformation data is applied by the first user device to a first device secret key of the first user device to generate a second device secret key, for transfer to the second user device, to ensure the second central secret key and the second device secret key are also associated with the single public key;

storing the second central secret key in association with the second user device; and generating an evolved second central secret key by applying a computation to the second central secret key, wherein the computation is applied in reverse to how the computation is applied by the second user device to the second device secret key transferred to the second user device from the first user device, based on secure communication between the key manager and the second user device, resulting in an evolved second device secret key and the evolved second central secret key, wherein the first user device is unable to generate the evolved second device secret key without transformation data used in the computation, and wherein both the evolved second device secret key and the evolved second central secret key are also associated with the single public key.

2. The method according to claim 1, wherein generating the second central secret key comprises applying the transformation data as a numerical offset to the first central secret key.

3. The method according to claim 1, further comprising:

receiving a request to perform a cryptographic action for one of the user devices, the request being associated with a particular one of the user devices;

selecting a central secret key corresponding to the user device of the request, yielding a selected central secret key; and cooperating with the user device of the request, such that the selected central secret key is applied by the key manager and a device secret key of the user device of the request is applied by the user device of the request, to thereby perform the cryptographic action.

4. The method according to claim 3, wherein cooperating with the user device of the request comprises:

applying the selected central secret key for a set of data, yielding resulting data; and transmitting the resulting data.

5. The method according to claim 3, wherein the cryptographic action is decrypting a set of data.

6. The method according to claim 3, wherein the cryptographic action is signing a set of data.

7. The method according to claim 1, wherein the transformation data comprises a numerical value.

8. A key manager for managing central secret keys of a plurality of user devices associated with a single public key, the key manager comprising:

a processor; and a memory storing instructions that, when executed by the processor, cause the key manager to:

receive, from a first user device, transformation data and an identifier of a second user device associated with the single public key;

obtain, from a data memory, a first central secret key associated with the first user device;

generate a second central secret key by applying the transformation data to the first central secret key, wherein the transformation data is applied in reverse to how the transformation data is applied by the first user device to a first device secret key of the first user device to generate a second device secret key, for transfer to the second user device, to ensure the second central secret key and the second device secret are also associated with the single public key;

store the second central secret key in association with the second user device; and generate an evolved second central secret key by applying a computation to the second central secret key, wherein the computation is applied in reverse to how the computation is applied by the second user device to the second device secret key transferred to the second user device from the first user device, based on secure communication between the key manager and the second user device, resulting in an evolved second device secret key and the evolved second central secret key, wherein the first user device is unable to generate the evolved second device secret key without transformation data used in the computation, and wherein both the evolved second device secret key and the evolved second central secret key are also associated with the single public key.

9. The key manager according to claim 8, wherein the instructions to generate the second central secret key comprise instructions that, when executed by the processor, cause the key manager to apply the transformation data as a numerical offset to the first central secret key.

10. The key manager according to claim 8, further comprising instructions that, when executed by the processor, cause the key manager to:

receive a request to perform a cryptographic action for one of the user devices, the request being associated with a particular one of the user devices;

select a central secret key corresponding to the user device of the request, yielding a selected central secret key; and cooperate with the user device of the request, such that the selected central secret key is applied by the key manager and a device secret key of the user device of the request is applied by the user device of the request, to thereby perform the cryptographic action.

11. The key manager according to claim 10, wherein the instructions to cooperate with the user device of the request comprise instructions that, when executed by the processor, cause the key manager to:

apply the selected central secret key for a set of data, yielding resulting data; and transmit the resulting data.

12. The key manager according to claim 10, wherein the cryptographic action is decrypting a set of data.

13. The key manager according to claim 10, wherein the cryptographic action is signing a set of data.

14. The key manager according to claim 8, wherein the transformation data comprises a numerical value.

15. A non-transitory computer readable medium comprising a computer program stored thereon for managing central secret keys of a plurality of user devices associated with a single public key, the computer program comprising computer program code which, when run on a key manager, causes the key manager to:

receive, from a first user device, transformation data and an identifier of a second user device;

obtain, from a data memory, a first central secret key associated with the first user device associated with the single public key;

generate a second central secret key by applying the transformation data to the first central secret key, wherein the transformation data is applied in reverse to how the transformation data is applied by the first user device to a first device secret key of the first user device to generate a second device secret key, for transfer to the second user device, to ensure the second central secret key and the second device secret key are also associated with the single public key;

store the second central secret key in association with the second user device and generate an evolved second central secret key by applying a computation to the second central secret key, wherein the computation is applied in reverse to how the computation is applied by the second user device to the second device secret key transferred to the second user device from the first user device, based on secure communication between the key manager and the second user device, resulting in an evolved second device secret key and the evolved second central secret key, wherein the first user device is unable to generate the evolved second device secret key without transformation data used in the computation, and wherein both the evolved second device secret key and the evolved second central secret key are also associated with the single public key.

* * * * *